United States Patent Office 3,518,093
Patented June 30, 1970

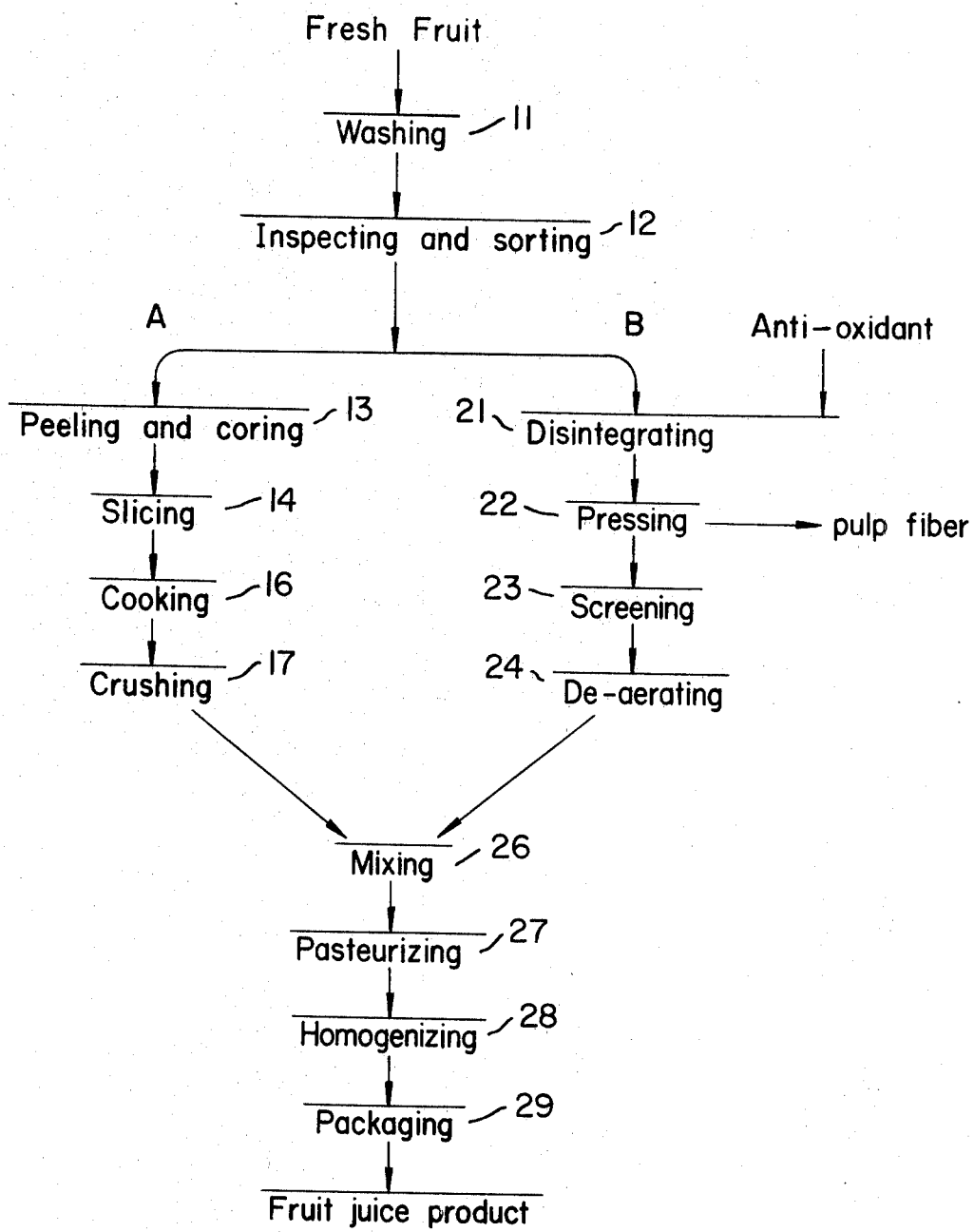

3,518,093
POME FRUIT JUICE CONTAINING PULP
Adolph Reynold Asti, San Carlos, Calif., assignor, by mesne assignments, to Redwood Food Packing Company, Redwood City, Calif., a corporation of California
Filed Mar. 28, 1966, Ser. No. 537,948
Int. Cl. A23l 1/02
U.S. Cl. 99—105        3 Claims

ABSTRACT OF THE DISCLOSURE

Production of a pome fruit juice resembling the natural fruit in liquid form by mixing desired proportions of pome fruit pulp, prepared by cooking and pulping pome fruits, and pome fruit juice, prepared by pressing the juice from disintegrated pome fruit. The fruit is pulped in the presence of an antioxidant.

---

This invention relates to a process for making fruit juice suspension and the resultant product. More particularly, it relates to a process of making a pome fruit juice, such as apple juice, containing suspended particles of fruit to resemble natural fruit in liquid form.

The fruits with which this invention is concerned are pome friuts, especially apples and pears, which do not have pits or rinds. Pome fruits consist of a fleshy outer layer enclosing a central core containing a small number of seeds within a papery capsule.

The juice of pome fruits, particularly apple juice, have enjoyed relatively little commercial success as compared with citrus juices. One reason for this is that the packaged juice product does not closely resemble the appearance of the freshly cut fruit, whereas citrus juices generally appear and taste much like the freshly cut natural fruit. Apple juice, for example, is usually filtered to provide a clear product of light amber color.

The flesh of a freshly cut apple has a milky-white appearance. The juice from the cells of the flesh has the same appearance as well as a pronounced apple odor and flavor. Exposure to air for even short periods causes oxidation-reduction reactions and the formation of an unattractive brown color in the flesh and juice. The oxidation of the substrate is caused primarily by enzymes in the apple which react in the presence of oxygen to form a brown product. To combat the oxidation, such juices are usually clarified and filtered to give a clear product which lacks the appearance, odor, and flavor of fresh apple.

An improvement upon clear apple juice and filtered pome fruit juices generally available has been "opalescent" juice. This juice, slightly milky in color and cloudy in clarity, is opalescent in appearance and is made by retaining fine pulp particles suspended in the juice.

Opalescent juices, while a significant improvement over clear, filtered pome fruit juices tend to vary widely according to the characteristics of the fruit which is crushed to form the juice. The viscosity of the juice varies considerably according to the characteristics of the source apples. Moreover, opalescent juices are low in viscosity, similar to clarified juices.

In addition, opalescent juices do not fully resemble the natural fresh fruit in body and texture. The opalescent juice alone may appear thin and watery.

Accordingly, it is an object of this invention to provide a pome fruit juice suspension which closely resembles the pome fruit in its natural state.

It is a further object of this invention to provide an apple juice suspension having body, viscosity, and texture of fresh natural apples in liquid form.

It is a further object of this invention to provide an apple suspension having the flavors, color, and odors of fresh apples in the natural state.

It is a further object of the invention to provide a novel method for producing products of the above character.

It is a further object of this invention to provide a method of blending pome fruit products to improve their characteristics.

It is another object of this invention to provide an improved method of preparing juice which is economical and easily controlled.

Additional objects of the invention will appear from the following description in which the preferred embodiments of the invention have been set forth in detail in conjunction with the accompanying drawing.

The figure is a flow sheet illustrating the process of the present invention.

Fresh fruit is prepared for the process by washing in step 11. With apples, I have found it convenient to wash in warm water at about 110–130° F., followed by rinsing with cold water at about 50–80° F. In step 12, the washed fruit is inspected and defective fruit is sorted out or trimmed. Step 12 can generally be carried out in a belt conveyor in a conventional manner.

The fruit is then passed to one of two paths A or B. In practice, storage tanks are provided at convenient locations for controlling the amount of fruit in each path. Usually, certain batches of fruit are passed to path A and stored and other batches of fruit are passed to path B at a different time. The products of the two paths may then be taken from storage as desired. However, division and separation of the fruit between the paths may take place at the same time if desired.

In path A, the washed sound fruit is first peeled and cored in step 13. Following this, in step 14, the fruit is sliced, and thence passed into a vessel for cooking in step 16. The steps of peeling, coring, slicing, and cooking are conventional in the manufacture of applesauce and equipment known to those skilled in the art is satisfactory.

In step 17 the cooked and prepared fruit is crushed. I prefer to use an ordinary pulper for crushing the fruit. The pulper forces the fruit through a screen. Preferably, the mesh openings in the screen should be 20 to 33 mils in order to reduce the time and effort in the homogenization presently to be described. After the crushing step 17, it is usually convenient to provide a storage tank for holding the product of path A in order to coordinate the whole process.

The fruit that is passed to path B is milled or disintegrated in step 21. Conventional machines, such as the Rietz Disintegrator or a hammermill, may be used to break the fresh fruit into relatively small particles. The fruit need not be disintegrated to any particular size in step 21 and, in fact, the particle size is usually not uniform. Generally speaking, however, the smaller the particles of crushed fruit, the less time that is required in subsequent steps. The maximum particle size is limited by the outlet openings of the mill and generally is about three-fourths inch. A convenient rate of feed to step 21 disintegrating is about 160 pounds per minute. Any rate of feed may be used to the disintegrator. However, where extremely high rates of feed are used the following pressing step may be unable to carry the increased volume. If, however, a sufficiently large press is used to cooperate with a high rate of feed to the disintegrator, the limiting factors may be the rate of preparing the pome fruits (peeling, coring, etc.) or the control of the rate of oxidation-reduction reactions.

It is essential to prevent or reverse the oxidation-reduction reactions which takes place with exposed fresh pome fruit. The fruit in path A is subjected to cooking which serves to arrest the enzymatic action which discolors the fruit through oxidation. In path B, however, the fruit is not cooked. Instead, an anti-oxidant is introduced in step 21, into the crush fruit at a point where the natural oxidation has not proceeded beyond return. That is, if anti-oxidant is added to the fruit before the oxidation process has resulted in the formation of a precipitate, the process may be reversed and browning of the juice will not occur. The amount of anti-oxidant required is simply the amount needed to prevent the formation of a precipitate in the juice. This amount, though small, varies with the type of fruit being crushed since the rate of oxidation varies with the type of fruit. For example, where ascorbic acid is the anti-oxidant and Gravenstein apples are the fruit, about 1 ounce of anti-oxidant per 100 pounds of fruit introduced to the disintegrator is usually sufficient to protect against discoloration throughout the process. I have found it convenient to introduce an anti-oxidant into the inlet throat of the mill used in the disintegrating step 21. The anti-oxidant can be introduced in a fine spray through a metering pump which proportions the amount of anti-oxidant sprayed to the amount of apple product flowing through the mill.

Any suitable food anti-oxidant may be used. I prefer to use ascorbic acid (Vitamin C) which is prepared in a standard solution in filtered apple juice. The standard solution is metered from a storage tank through a fine spray nozzle directly into the throat of the mill which carries out the disintegration step 21. I have found 30–40 ounces of a 5 percent standard solution of ascorbic acid should be added for each 160 pounds of apples to be milled. Other food anti-oxidants, such as butylated hydroxyanisole, di-tert-butyl-para-cresol and propyl gallate, may be substituted for ascorbic acid so long as a sufficient amount is introduced to reverse or arrest the oxidation process.

By introducing the anti-oxidant at the inlet throat of the disintegrator, the natural color of the apple is preserved and the brown color which occurs on oxidation is avoided.

In step 22, the crushed and disintegrated fruit is pressed to express the juice from the pulp. I prefer to use a wood rack and cloth in a hydraulic press. Any conventional press cloth, such as a nylon press cloth may be used. To maximize the yield, substantial pressures may be applied to the pulp in the press. For example, pressures on the order of 2500 to 2800 p.s.i.g. are found satisfactory. However, if low pressure equipment is used, a satisfactory product may be obtained although the yield might be somewhat less. Alternatively, a hydraulic bag press or a continuous dejuicing press may be employed in step 22.

In step 23 the juice is put through a screen which serves to remove any coarse pulp, seeds or skins which could be borne in the juice from the press; I prefer to use a vibrating screen to maximize the recover of juice from the coarse pulp. A screen size of 15 mils has been found suitable. A rotating screen may also be used.

In step 24, the screened juice is de-aerated. Suitable means may be used to remove air from the juice. I prefer to use a centrifugal de-aerator under a vacuum of 25 to 28 inches. The de-aerated juice may then be stored, if necessary, for coordinating path B with path A.

The de-aerated juice from step 24 is "obalescent." That is, it is cloudy and slightly milky in color, resembling very closely the color and appearance of the fresh apple. However, the opalescent juice at step 24 has had a large amount of the pulp fiber removed in step 22 and, consequently, lacks body and texture resembling the cut fruit. In addition, the opalescent juice, being primarily unfiltered juice, maintains the appearance, color and flavor of the particular fruit introduced in path B. The viscosity is also low and is directly dependent on the characteristics of fruit of path B.

In step 26 the products of paths A and B are mixed. The crushed cooked fruit of path A, primarily apple pulp when apples are used, provides a body, texture and viscosity to the mixture. The product of path B provides fresh uncooked, unfiltered juice which retains many of the characteristics of the fresh fruit. Mixing may conveniently take place in a proportioning pump which is connected to a juice tank from path B and a pul ptank from path A. By controlling the speed of each drive input, the juice and pulp are proportioned at any desired ratio. Preferably, the juice should be at least 70 percent of the total weight of the mixture to keep the product a pourable liquid. On the other hand, if over 95 percent juice is mixed, the benefits derived from the pulp are largely lost. Consequently, I prefer to add between 70 and 95 percent juice to 5 percent to 30 percent pulp to form the blended suspension.

Inasmuch as the products of paths A and B are mixed in any desired proportions, it is possible to blend the fruits to obtain a desired color or flavor. Each kind of fruit has its own characteristics, not only as to color and flavor, but also as to amount of juice, viscosity of pulp, oxidation rate, etc. Moreover, different grades and kinds of apples may be used for economical blends without sacrifice of desirable characteristics. For example, if apples of relatively low quality are cooked in path A, the final product may be upgraded by adding high quality juice in larger amounts from path B. Obviously, many variations are possible, providing flexibility and control to the processor.

In practice, I find it convenient to introduce the blended suspension into a holding tank after mixing in step 26. The holding tank simply serves to conveniently carry out the next step.

In step 27 the mixture is pasteurized. While any convenient means for pasteurization may be employed, I prefer to use a conventional milk pasteurizer in which the mixture is heated to about 185 to 200° F. The mixture enters at room temperature and exits less than one minute later at the desired temperature.

After pasteurization, the mixture is homogenized in step 28. In the event a batch type homogenizer is used, it is desirable to provide a storage tank for the pasteurized mixture before entering the homogenizer. For most effective homogenization, I prefer to homogenize under a pressure of about 2500 to 3500 p.s.i. in the homogenizer. These pressures are within the capacity of conventional homogenizers known to those skilled in the art. The pressure in the homogenizer varies depending upon the consistency and viscosity of the product from paths A and B.

In step 29, the homogenized mixture is supplied to container filling means. The filling must take place while the blend is still hot in order to maintain pasteurization. Preferably, the filling temperature is not below 180° F. The containers may be glass bottles or conventional plastic or metal containers. I prefer glass bottles which are closed by subjecting to vacuum and capping in the presence of a steam bath. Any other suitable closure technique may also be used.

After closing the containers, I prefer to pass them through a liquid bath to cool to a temperature suitable for convenient handling such as below 100° F.

EXAMPLE

Fresh Gravenstein apples in two batches were washed in warm water, rinsed in cold water, and inspected. The sound fruit of the first batch were peeled, cored, and sliced before cooking in a continuous steam cooker. The cooked apples were strained through a pulper having openings of 20 mils and passed into a storage tank. The second batch of sound apples were crushed in a hammermill to a coarse pulp in the presence of a fine spray of ascorbic acid introduced through a metering pump as a standard solution of 5 percent ascorbic acid in filtered apple juice. The disintegrated pulp was pressed in a hydraulic press with a wood rack and cloth. The juice was then passed through a vibrating screen having a mesh size of .015 inch and de-aerated at 25" vacuum. The juice and pulp were blended in the ratio of 8 parts juice to 2 parts apple pulp. The mixture was then pasteurized, homogenized and canned in glass jars.

The product thus produced was a stable suspension of pulp fiber in apple juice which did not separate and settle on standing. The blended product has relatively high viscosity, although it was readily pourable. The body and texture gave the appearance of natural apples in a liquefied state. The color and odor also closely resembled the milky white appearance of freshly cut apples. The flavor of the resulting product was substantially closer to the flavor of fresh apples than the clarified and filtered apple juice currently marketed.

It will thus be seen that a product resembling liquefied apple, or other pome fruit, is obtained. This product resembles to a very great degree the natural characteristics of the fruit, together with a considerable portion of the pulp fiber. The juice is not oxidized and the only additive fiber is removed from the fruit juice being processed.

I claim:
1. A method for producing a pome fruit juice product comprising these steps:
   (a) subjecting a first batch of pome fruit to the following steps: peeling and coring the pome fruit, slicing, cooking, and crushing the peeled and sliced fruit to form a pome fruit pulp;
   (b) subjecting a second batch of pome fruit to the following operations: disintegrating the pome fruit in the presence of an antioxidant, pressing the disintegrated pulp, and screening coarse solids from the pressed fruit to recover the juice therefrom;
   (c) mixing the pulp formed in step (a) with the juice formed in step (b) in predetermined portions to form a suspension of pulp in pome fruit juice.

2. A process as in claim 1 wherein said predetermined portions are five to thirty percent pome fruit pulp and seventy to ninety-five percent pome fruit juice.

3. In a method of producing a fluid apple juice product, the steps of washing fresh apples and separating them into two portions, subjecting the first portion to the following steps: disintegrating the apples in the presence of a predetermined amount of ascorbic acid in a fine spray, pressing the disintegrated pulp, and screening the pulp and recovering the opalescent juice; subjecting the apples in the second portion to the following steps: peeling, slicing, cooking and pulping; mixing the product of the first portion with the product of the second portion in predetermined proportions, and then pasteurizing and homogenizing the mixture to form a fluid product resembling natural apples.

References Cited

UNITED STATES PATENTS

| 2,631,103 | 3/1953 | Kermer | 99—155 |
| 3,301,685 | 1/1967 | Harwell | 99—105 |

FOREIGN PATENTS

| 708,560 | 4/1965 | Canada. |

OTHER REFERENCES

Caldwell, Farmers Bulletin #1264, U.S. Department of Agriculture, 1924, pp. 31-35.

Heller et al., Survey of Apple Juice Packed in 1946, Eastern Regional Research Laboratory, 1946, pp. 1-10.

A. LOUIS MONACELL, Primary Examiner

R. B. ANDEWELT, Assistant Examiner

U.S. Cl. X.R.

99—155